June 23, 1953  L. R. SPANN ET AL  2,642,964
BRAKE SLACK ADJUSTER FOR RAILWAY CARS
Filed Nov. 10, 1951
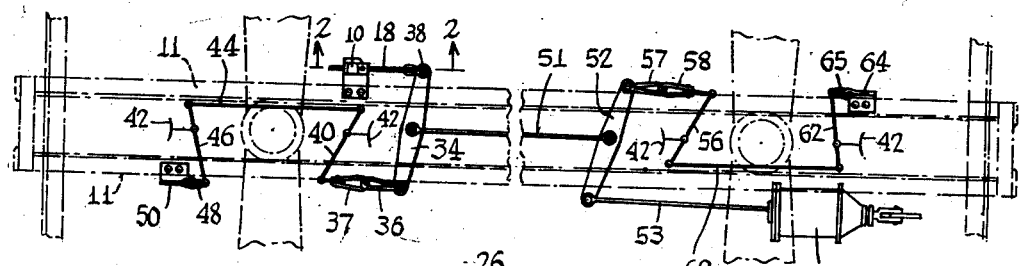
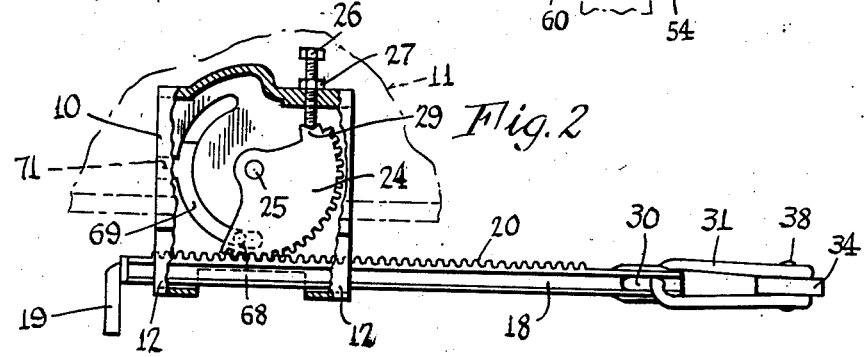
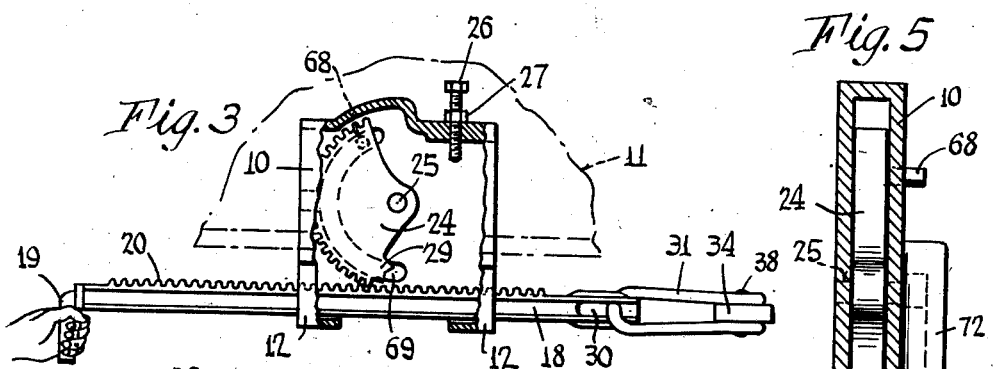
Inventors
Lawrence R. Spann
George R. Tarbox
Johnson and Kline
Attorneys Patented June 23, 1953

2,642,964

UNITED STATES PATENT OFFICE 2,642,964

BRAKE SLACK ADJUSTER FOR RAILWAY CARS

Lawrence R. Spann, Naugatuck, and George R. Tarbox, Cheshire, Conn., assignors to Eastern Malleable Iron Company, Naugatuck, Conn., a company of Connecticut Application November 10, 1951, Serial No. 255,802

9 Claims. (Cl. 188—200)

The present invention relates to improvements in slack adjusters for the brake rigging of railway rolling stock and more particularly to manually operable slack adjusters in which excess slack due to wear of the brake shoes is taken up to provide for substantially constant travel of the piston of the air brake cylinder actuating the brakes.

When railway rolling stock, such as a freight car, for example, is initially placed in service, the piston of the air brake cylinder actuating the brake shoes has a predetermined normal travel on the order of 7 to 9 inches. These brake shoes wear down in use and eventually more than the normal travel of the air brake piston is required to move the brake shoes against the car wheels to apply the required amount of braking force. As a consequence, adjustments have to be made from time to time in order that the normal and desirable amount of travel of the piston is capable of applying the brakes.

When the brake shoes eventually wear down to such an extent that no further adjustments are possible and new brake shoes are required, provision must be made to retract the worn-out brake shoes sufficiently from the wheel of the railway car to permit such replacement to be made.

Heretofore, slack adjusters have been provided with a toothed take-up rod which could be manually pulled in one direction to apply the brakes and move the piston to the end of its travel, if not already there. When the take-up rod was released and the weight of the brake beams falling away from the wheels moved it in the reverse direction, a measuring mechanism, such as a sliding pawl engaged the teeth of the take-up rod and limited the reverse movement of the brake rigging and of the shoes away from the car wheels to thereby provide predetermined slack and clearance between the shoes and the wheels.

To release the take-up rod from the limiting control of the pawl, as when applying new brake shoes, the rod was rotated about its axis to cause the teeth thereon to disengage and be free of the pawl, whereby the rod was permitted a maximum reverse movement, unlimited by the pawl, to provide a maximum clearance between the brake shoes and the car wheels.

Such slack adjusters operated on a normal fixing point in the system of levers making up the brake rigging, and hence take the entire load of applying the brakes. As a consequence, they had to be sturdy and reliable in operation.

It is a purpose of the present invention to provide an improved slack adjuster for railway car brakes which is more positive and reliable in operation, more economical to make and easier to use than those heretofore proposed.

It is a further purpose of the present invention to provide a slack adjuster which is sturdier in construction and more capable of taking the load applied during braking.

A still further purpose of the present invention to provide a slack adjuster which cannot be jolted or jounced out of operative engagement but which can be easily manually disengaged when desired.

This is accomplished according to the present invention by employing a segmental gear as the measuring mechanism for the reverse movement of the take-up rod in providing the proper amount of slack or clearance between the brake shoes and the car wheels. The operating take-up rod or rack is normally in engagement with this segmental gear and, when it is desired to establish the proper slack, it is pulled in one direction to set the brakes against the wheels and, at the same time, rotate the segmental gear until the last tooth thereon has just passed beyond the driving rack teeth. When this occurs, the brake shoes will normally be positioned against the car wheels. However, if the brake shoes have worn and are now so positioned so that additional movement thereof is necessary, in an additional movement given to the rack, its teeth idly click past the last tooth of the segmental gear until the brake shoes contact the wheels. When the rack thereafter moves in the opposite direction toward its original position the brake shoes are free to back-off from the wheels. In so doing, the rack immediately re-engages the segmental gear and rotates it in a reverse direction until an abutment thereon engages an adjustable stop which movement permits the brake shoes to fall away from the car wheels an accurately measured and proper amount. The length of the segmental gear is such that, when the abutment strikes the stop, several teeth of the gear remain in engagement with the toothed take-up rod so that any stresses created during actuation of the brakes are distributed over several teeth.

Other purposes, as well as features and advantages of the present invention, will become apparent from a consideration of the accompanying drawing and the following specification where we have illustrated and described a preferred design of machine embodying our inventive concept but it is to be understood that our invention is not to be considered limited to the specific construction disclosed except as determined by the scope of the appended claims.

In the accompanying drawings:

Figure 1 is a diagrammatic plan view of the slack adjuster of the present invention as applied to the brake rigging of a railway freight car of the hopper type.

Fig. 2 is a view in elevation taken on the line 2—2 of Fig. 1 showing the slack adjuster with the housing thereof cut away to illustrate the operating parts in their adjusted positions wherein the required brake shoe clearance is provided by the proper travel of the air brake piston.

Fig. 3 is a view similar to Fig. 2 but showing the operating parts during the manual adjustment thereof whereby the required brake shoe clearance may be provided by the proper travel of the air brake piston.

Fig. 4 is a view in elevation of the slack adjuster showing the side opposite to that of Figs. 2 and 3 to illustrate the manually operable retaining pin and slot therefor.

Fig. 5 is a cross sectional view of the slack adjuster of the present invention taken on the line 5—5 of Fig. 4.

Referring now to the drawings in which a preferred embodiment of our invention is shown, the slack adjuster of the present invention comprises a supporting bracket or housing 10 which may be secured to the center sill 11 or other convenient part of the railway car upon which it is to be used. The lower portion of the housing 10 has two legs 12, 12 in each of which are formed vertical slots 13 from which extend horizontally extending grooves or tracks 14, as shown in Fig. 5.

A horizontally extending operating pull-rod or rack bar 18, preferably I-shaped in cross-section, is mounted for sliding movement within the slots 13 and tracks 14. As shown in Fig. 5, the body of the rack bar 18 slidably fits within the slot 13 and has outwardly extending flanges slidingly supported within the tracks 14 whereby the rack bar is capable of reciprocating motion within the housing 10 without any possibility of rotation about its own axis. Although the rack bar 18 has been illustrated and described as having an I-shaped cross-section, it is to be realized that such is not to be construed as limitative of the invention but that other structural members are similarly of use.

The rack bar 18 may have a handle 19 at one end thereof whereby it may be manually moved from the position shown in Fig. 2 to the left to the position shown in Fig. 3. As shown, teeth 20 are formed in the upper surface of the rack bar 18 and it is to be appreciated that these teeth will always face upwardly since the rack bar cannot be rotated. A segmental gear or pinion 24 is rotatably mounted upon a shaft 25 mounted in housing 10 and is adapted to be engaged by the rack bar teeth 20 and rotated thereby when the rack bar 18 is moved to the right or left.

Moving the rack bar to the left will bring about a rotation of the segmental gear in a clockwise direction which is measured and limited solely by the extent of the effective cooperation of the gear teeth and the corresponding rack teeth 20 and such rotation of the gear will cease when the last gear tooth has cleared the driving rack teeth, as shown in Fig. 3. Any further movement of the rack bar to the left cannot rotate the segmental gear any more inasmuch as the rack bar will merely idly click by the gear teeth resting thereon by gravity without any effective driving engagement therebetween.

Return movement of the rack bar to the right then will bring about a rotation of the segmental gear 24 in a counterclockwise direction which is measured and limited by a stop such as a bolt 26 threaded into the housing 10 and adjustably secured in desired position by a lock nut 27. An abutment 29 is provided on the gear 24 to cooperate with the stop 26 to effectively end the reverse movement of the rack bar.

Thus, it will be apparent that, when the rack bar 18 is first moved to the left, it will cause the brake rigging to be moved to a configuration wherein the brake shoes are applied to the car wheels and, at the same time, will rotate the segmental gear 24 clockwise until the last gear tooth has cleared the driving rack teeth 20. Continued movement of the rack bar 18 beyond this point of tooth engagement, if such movement is possible because of wearing of the brake shoes, will not affect the segmental gear 24 because one or more of the rack teeth 20 will idly slip by the last tooth of the segmental gear, gravity tending to re-engage the segmental gear and the rack. When the rack bar 18 is released and is permitted to return to the right, its rack teeth 20 will immediately be engaged by the teeth of the gear 24 and will rotate the same counterclockwise until contact is made between the abutment 29 and the adjustable stop 26. The return rotation of the gear thus limits and measures the movement of the rack to the right to a predetermined extent as determined by the length of arc travelled by the abutment 29 in rotating from the free position of Fig. 3 to the stop-contacting position of Fig. 2.

According to the present invention, the segmental gear 24 is of such arcuate length that, when the pull-rod 18 has moved to the right to its operating position, several teeth thereof remain in engagement with several teeth of the segmental gear 24 thus distributing the load over a substantial area. This cannot be done with a pawl and rack or ratchet arrangement wherein but one tooth is in engagement with the rack or ratchet.

For the purpose of illustrating the present invention, we have shown diagrammatically the slack adjuster in combination with a railway car brake rigging in Fig. 1. An elongated opening 30 is provided in the rack bar 18 at the end thereof opposite to the handle 19 and provides means whereby the rack bar 18 may be secured to the brake rigging. A clevis 31 extends through the opening 30 of the rack bar and is pivotally secured at its bifurcated end to an operating lever 34 by means of a pivot pin 38. The operating lever 34 pivotally carries at its lowermost end a clevis 36 which is connected to a second clevis 37 pivotally secured to the lower end of a live lever 40. The live lever 40 pivotally carries on a central position thereof the necessary brake head and brake shoes (generally indicated by the reference numeral 42) which are to apply the braking force to the car wheels.

The live lever 40 extends upwardly beyond the pivotal connection for the brake head and brake shoes and is pivotally secured at its lower end to a connecting rod 44. The connecting rod 44 extends over to a dead lever 46 which carries centrally thereof the necessary brake heads and brake shoes 42 to apply the braking force to the other pair of car wheels. The dead lever 46 extends downwardly and is secured by means of a clevis 48 to a bracket 50 rigidly mounted on the center sill 11 of the freight car, or to any other convenient part thereof.

A central connecting rod 51 is secured pivotally to a central position of the operating lever 34 and extends over to the central portion of a corresponding operating lever 52 of the other truck of the freight car. Operating lever 52 has pivotally secured to its lower end a connecting rod 53 which forms an extension of a piston rod within an air brake cylinder 54 which is operated by compressed air or other suitable means. The upper end of operating lever 52 is connected to a live lever 56 by means of a pair of clevises 57, 58 or other suitable linkages. Live lever 56 carries centrally thereon the necessary brake heads and brake shoes 42 used to apply the braking force. The lower end of live lever 56 is pivotally secured to a connecting rod 60 which, in turn, is pivotally linked to a dead lever 62. The dead lever 62 carries centrally thereon the brake heads and shoes 42 to apply the braking forces to the car wheels associated therewith. The upper end of the dead lever 62 is fastened to the freight car by means of a clevis 65 and a bracket 64 which may be rigidly mounted on the center sill 11 or any other convenient part of the railway car.

Whenever it is desired to make certain that the proper amount of brake-shoe slack is present or whenever it is required to adjust the slack in the railway car brake rigging due to wear of the brake shoes, it is merely necessary to pull the rack bar 18 to the left, as viewed in Fig. 1, which sets all of the brakes against the car wheels with which they are associated. The rack bar 18 is then released so that it can freely move to the right, as shown in Fig. 1, and in so moving permits all of the brake shoes to fall away from their respective wheels a predetermined distance and to start the reverse movement of the rack bar 18 to the right. This distance which the brake shoes fall away from the car wheels is determined and measured by the return movement of the rack bar to the right, as controlled and limited by the rotation of the segmental gear. During this movement to the right, the teeth of the gear 24 are engaged by the teeth 20 of the rack and cause it to move from the position shown in Fig. 3 to the position shown in Fig. 2. It will be appreciated that the extent of this rotational movement is limited by the abutment 29 and the stop 26. This measured distance is, of course, the desired amount of slack necessary for the proper operation of the brake shoes upon a normal travel of the piston of the air brake cylinder. The adjustable stop 26 provides for the variation of the extent of this movement whereby the amount of slack provided may be selected and predetermined within certain prescribed limits.

It is therefore seen that one actuating movement of the rack bar in one direction, followed by its permitted or forced movement in the opposite direction, is all that is required to adjust all of the brake shoes on the railway car.

Whenever it is desired to remove or replace the brake shoes, such as when they are worn out, it is necessary that the brake shoes be retracted a maximum distance from the car wheels. Inasmuch as this distance is determined by the amount of reverse movement of the rack bar, it is apparent that, if the reverse movement can be increased, the extent of brake-shoe retraction from the car wheel will be correspondingly increased. This is accomplished by first moving the rack bar to the left in the usual fashion to disengage the rack from the gear and then by holding the gear up and out of engagement with the rack bar so that it will return with a maximum movement to the right, free of the limiting rotation of the gear.

The structure whereby this is accomplished is best shown in Figs. 4 and 5. A manually operable holding or retaining pin 68 extends axially outwardly from the side face of the segmental gear 24 and protrudes through an arcuate slot 69 formed in the side of the housing 10. The pin 68 is either formed with the gear 24 or is secured thereto as by welding or similar means and moves with the gear during its rotational movements from the position shown in Fig. 2 to that shown in Fig. 3, and vice versa.

When the rack bar 18 has been manually moved to the position wherein the segmental gear 24 is substantially out of driving engagement with the teeth 20 of the rack, the pin 68 will be raised to the position shown in Fig. 4 wherein it may be manually held up and away from the rack bar 18. Therefore, when the rack bar 18 is released and makes its return movement, it will be permitted a maximum travel whereby the brake shoes are, at the same time, permitted to fall away from the car wheels a maximum distance.

An opening 71 is provided in the housing 10 and extends from the edge of the housing radially inwardly into the arcuate slot 69. Inasmuch as the ends of the housing are open, as can be seen in Fig. 5, the gear 24 and its axially extending pin 68 may be positioned in the housing by sliding the gear inwardly through the open housing end with the pin 68 sliding inwardly through the opening 71 into the slot 69. Once the pin 68 has reached its position in slot 69, the shaft 25 is inserted to hold the gear which then may be rotated as desired. Removal of the gear and attached pin is accomplished by a reverse operation, namely, rotating the gear until the pin 68 is aligned with the opening 71, removing the shaft 25, and then sliding the gear and pin outwardly.

An enlarged arcuate portion 72 is formed in the opening to cover and protect the lower portion of the slot 69. This enlarged portion extends over the opening 71 and covers and strengthens the same. The length of this enlarged portion should not be such as to hinder the holding or retaining of the pin 68 when it is desired to hold the pin up and maintain the gear 24 out of driving engagement with the rack bar 18.

While we have shown and described what we believe to be a preferred embodiment of our invention in the matter of simplicity and durability of construction, ease of operation, etc., it will be obvious that the details of such construction may be more or less modified within the scope of the claims without departure from the principles of construction or material sacrifice of the advantages of the preferred design.

We claim:

1. A slack adjuster for use on a railway car brake rigging for adjusting the positions of brake shoes on the car with respect to the car wheels comprising two cooperating members, one being movable relatively to the other, said members consisting of a housing and an operating toothed member movably supported in said housing and connected to the railway car brake rigging; and a segmental gear rotatably mounted in said housing and engaging said toothed member and rotated thereby during the relative movement of said cooperating members, said gear when rotated in one direction by relative movement of said cooperating members disengaging said toothed member to provide for continued relative movement of said cooperating members independently of said gear to bring the brake shoes into engagement with said car wheels, said gear automatically re-engaging said toothed member for rotation thereby upon reverse relative movement of said members to limit and measure the said reverse movement in accordance with said rotation and thereby provide a predetermined amount of clearance between the brake shoes and the car wheels.

2. A slack adjuster for use on a railway car brake rigging for adjusting the positions of brake shoes on the car with respect to the car wheels comprising two cooperating members, one being movable relatively to the other, said members consisting of a housing and an operating toothed member movably supported in said housing and connected to the railway car brake rigging; a segmental gear rotatably mounted in said housing and engaging said toothed member and rotatable thereby during the relative movement of said cooperating members, said gear, when rotated in one direction by relative movement of said cooperating members, disengaging said toothed member to provide for continued relative movement of said cooperating members independently of said gear to bring the brake shoes into engagement with said car wheels, said gear automatically re-engaging said toothed member for rotation thereby upon reverse relative movement of said members to limit and measure the said reverse movement in accordance with said rotation and thereby provide a predetermined amount of clearance between the brake shoes and the car wheels; and adjustable means to vary the length of said reverse relative movement to regulate said clearance.

3. The invention as defined in claim 1, wherein means are provided to maintain said gear and said toothed member disengaged, whereby said reverse relative movement is independent of and not limited by engagement of said gear with said toothed member and is thereby increased to provide a maximum amount of clearance between the brake shoes and the car wheels.

4. The invention as defined in claim 1, wherein the length of the periphery of said segmental gear is such that several gear teeth thereof will remain in engagement with said toothed member when the position of predetermined clearance between the brake shoes and the car wheels is reached whereby the load applied during braking is distributed over said several engaged teeth.

5. A slack adjuster for use on a railway car brake rigging for adjusting the positions of brake shoes on the car with respect to the car wheels comprising two cooperating members, one being movable relatively to the other, said members consisting of a housing and an operating toothed member movably supported in said housing and connected to the railway car brake rigging; a segmental gear rotatably mounted in said housing and engaging said toothed member and rotatable thereby during the relative movement of said cooperating members, said gear, when rotated in one direction by relative movement of said cooperating members, disengaging said toothed member to provide for continued relative movement of said cooperating members independently of said gear to bring the brake shoes into engagement with said car wheels; and means to maintain said gear and said rack disengaged to provide a reverse relative movement of said members independently of and unlimited by said gear whereby the brake shoes are positioned a maximum clearance distance from the car wheels.

6. A slack adjuster for use on a railway car brake rigging for adjusting the positions of brake shoes on the car with respect to the car wheels comprising two cooperating members, one being movable relatively to the other, said members consisting of a housing and an operating toothed member movably supported in said housing and having one end connected to the railway car brake rigging; a segmental gear rotatably mounted in said housing engaging said toothed member and rotatable thereby during the relative movement of said cooperating members, said gear, when rotated in one direction by relative movement of said cooperating members, disengaging said toothed member to provide for continued relative movement of said cooperating members independently of said gear to bring the brake shoes into engagement with said car wheels; and a pin on said gear, movable through an opening in said housing when said gear and toothed member are disengaged, by means of which said gear may be maintained disengaged from said toothed member to provide a maximum reverse relative movement of said cooperating members independent of and unlimited by said gear to provide maximum clearance between the brake shoes and the car wheels.

7. A slack adjuster for use on a railway car brake rigging for adjusting the positions of brake shoes on the car with respect to the car wheels comprising two cooperating members, one being movable relatively to the other, said members consisting of a housing having a slot therein with tracks extending outwardly therefrom and an operating toothed rack having a body slidably fitting within said slot and having flanges extending outwardly from said body and slidably supported within the tracks of said housing; a mechanical linkage between said rack and the brake shoes of the railway car brake rigging; and a segmental gear rotatably mounted in said housing and engaging said rack and rotatable thereby during the relative movement of said cooperating members, said gear, when rotated in one direction by relative movement of said cooperating members, disengaging said rack to provide for continued relative movement of said cooperating members independently of said gear to bring the brake shoes into engagement with the car wheels, said gear automatically re-engaging said rack for rotation thereby upon reverse relative movement of said members to limit and measure the said reverse movement in accordance with said rotation and thereby provide a predetermined amount of clearance between the brake shoes and the car wheels.

8. A slack adjuster for use on the brake rigging on a railway car for adjusting the positions of brake shoes on the car with respect to the car wheels comprising a housing having a slot therein and tracks extending outwardly from said slot; an operating toothed rack having a body slidably fitting within said slot and having flanges extending outwardly from said body and slidably supported within said tracks, said housing and rack being capable of relative movement, said rack having one end connected to the railway car brake rigging; a segmental gear rotatably mounted in said housing and engaging said rack and rotatable thereby through predetermined arcs, said gear being capable of sufficient rotation in an arc whereby it is disengaged from said rack to free the rack for continued movement in one direction to bring the brake shoes into engagement with the car wheels, said gear also being capable of limited rotation in another arc in a direction opposite to that of the first arc whereby the rack has a measured movement in the other direction to provide a predetermined amount of clearance between said brake shoes and the car wheels; and adjustable means to vary the length of said measured movement to regulate said clearance.

9. A slack adjuster for use on the brake rigging on a railway car for adjusting the positions of brake shoes on the car with respect to the car wheels comprising a housing; a pair of supporting legs integrally formed with said housing, each of said legs having therein a slot and tracks extending outwardly from said slot; an operating toothed rack having an I-shaped cross section, the body portion of which slidably fits within each of said slots and a flanged portion of which is slidably supported within each of said tracks, said housing and rack being capable of relative movement, said rack having one end connected to the railway car brake rigging; a segmental gear rotatably mounted in said housing and engaging said rack and rotatable thereby through predetermined arcs, said gear having sufficient rotation in an arc whereby it is disengaged from said rack to free the rack for continued movement in one direction to bring the brake shoes into engagement with the car wheels, said gear also having limited rotation in another arc in a direction opposite to that of the first arc whereby the rack has a measured movement in the other direction to provide a predetermined amount of clearance between said brake shoes and the car wheels; and adjustable means to vary the length of said measured movement to regulate said clearance.

LAWRENCE R. SPANN.
GEORGE R. TARBOX.

References Cited in the file of this patent

UNITED STATES PATENTS

| Number | Name | Date |
|---|---|---|
| 753,650 | Wands | Mar. 1, 1904 |
| 1,335,631 | Youmans | Mar. 30, 1920 |
| 1,420,826 | Fernholtz | June 27, 1922 |
| 2,067,451 | Jacob | Jan. 12, 1937 |

FOREIGN PATENTS

| Number | Country | Date |
|---|---|---|
| 257,780 | Great Britain | Sept. 9, 1926 |